United States Patent
Kim et al.

(10) Patent No.: US 7,640,027 B2
(45) Date of Patent: Dec. 29, 2009

(54) MOBILE COMMUNICATION TERMINAL CAPABLE OF DETERMINING POSITION AND METHOD OF DETERMINING POSITION IN THE MOBILE COMMUNICATION TERMINAL

(75) Inventors: Tae Il Kim, Seoul (KR); Tae Joon Ha, Kyungi-Do (KR); Eun Young Kim, Seoul (KR); Hyuk Jin Sohn, Seoul (KR)

(73) Assignee: Radiant Technologies, Inc.

( * ) Notice: Subject to any disclaimer, the term of this patent is extended or adjusted under 35 U.S.C. 154(b) by 544 days.

(21) Appl. No.: 11/485,502

(22) Filed: Jul. 12, 2006

(65) Prior Publication Data

US 2007/0232324 A1 Oct. 4, 2007

(30) Foreign Application Priority Data

Mar. 29, 2006 (KR) ...................... 10-2006-0028302

(51) Int. Cl.
 *H04W 24/00* (2006.01)
(52) U.S. Cl. .............. 455/456.6; 455/456.1; 455/404.2; 455/414.2; 340/126; 340/450
(58) Field of Classification Search .............. 455/456.1, 455/456.6, 404.2, 414.2; 342/126, 450
See application file for complete search history.

(56) References Cited

U.S. PATENT DOCUMENTS 6,289,279 B1  9/2001  Ito et al.
6,459,903 B1  10/2002  Lee et al.
2004/0203884 A1*  10/2004  McCalmont et al. ..... 455/456.1
2005/0078033 A1*  4/2005  Tamaki et al. ............... 342/463

FOREIGN PATENT DOCUMENTS

| JP | 2000184431 | 6/2000 |
| JP | 2001061178 | 3/2001 |
| JP | 2003233555 | 8/2003 |
| KR | 10-2003-0058552 A | 7/2003 |
| WO | WO-2006031035 | 3/2006 |

OTHER PUBLICATIONS

International Search Report for PCT/KR2006/002403.

* cited by examiner

*Primary Examiner*—Nghi H Ly
(74) *Attorney, Agent, or Firm*—Marshall, Gerstein & Borun LLP

(57) ABSTRACT

A mobile communication terminal capable of position determination, including: a base station information recorder recording detailed base station information corresponding to at least one base station; a base station signal receiver receiving base station signal information from a reference base station at a predetermined interval; a base station information reader reading the detailed base station information with respect to a base station corresponding to the received base station signal information, from the base station information recorder; and a position determiner determining a position of the mobile communication terminal by using the received base station signal information and the read detailed base station information.

20 Claims, 8 Drawing Sheets

MOBILE COMMUNICATION TERMINAL CAPABLE OF DETERMINING POSITION AND METHOD OF DETERMINING POSITION IN THE MOBILE COMMUNICATION TERMINAL

CROSS-REFERENCE TO RELATED APPLICATION

This application claims priority from Korean Patent Application No. 10-2006-0028302, filed on Mar. 29, 2006, in the Korean Intellectual Property Office, the disclosure of which is incorporated herein by reference.

BACKGROUND OF THE INVENTION

1. Field of the Invention

The present invention relates to a mobile communication terminal capable of determining a position, and more particularly, to a mobile communication terminal for determining a position of the mobile communication terminal by using base station signal information received from a base station in the mobile communication terminal and a method of determining a position in a mobile communication.

2. Description of the Related Art

Due to development of Internet and mobile communication technologies and services and progress of mobile communication terminals such as a mobile phone and PDA, location-based service (LBS) is considered as a new service quickly growing with the Internet.

Recently, the LBS provides advertisements, order delivery services, coupon services, urgent alert services, distribution management systems, as well as providing information associated with a position of a user having a mobile communication terminal, by using a wired or wireless communication system.

As described above, the LBS started with personal services and has gradually spread and develop toward electronic commerce, traffic services, and medical services.

A wireless position determination technology of the LBS is for determining a position of a mobile terminal and may be classified into a network-based type, a handset-based type using a GPS receiver installed to the terminal, and a hybrid type in which the network-based type and the handset-based type are combined. Though the network-based type does not use any additional device installed to a mobile communication terminal, there is great disparity in precision when determining the position. Depending on a size of a cell of a base station of a communication network and a determination method, an error of the determination is generally from approximately 500 meters to several kilometers. Also, the error of the determination increases in proportion to a cell range of the base station. The handset-based type requires an additional signal receiving apparatus to be installed to a mobile communication terminal, such as a GPS receiver, and is capable of higher precision when determining a position when compared to the network-based type. However, in a downtown area with many high buildings, a shadow area such as underground and a tunnel, and a forest area with many trees, there is interference in receiving a signal and a position may not be determined.

Also, in a conventional network-based type, since a position is calculated by a server connected to a mobile communication network, a mobile communication terminal has to receive a result of position determination from the server via the mobile communication network, thereby increasing network loads. Also, when a position of a reference base station is not included in position information received by the mobile communication terminal and only a base ID of the reference base station is received, the mobile communication terminal has to receive the position of the reference base station corresponding to the base ID of the reference base station via the mobile communication network, thereby increasing the network loads and lengthening a required time.

SUMMARY OF THE INVENTION

An aspect of the present invention provides a mobile communication terminal capable of position determination and a method of determining a position in the mobile communication terminal, in which the position of the mobile communication terminal is determined in the mobile communication terminal by using base station signal information with respect to a reference base station and peripheral base stations and detailed base station information with respect to the reference base station and the peripheral base stations, sent from a server, thereby more precisely determining the position of the mobile communication terminal.

An aspect of the present invention also provides a mobile communication terminal capable of position determination and a method of determining a position in the mobile communication terminal, in which the position of the mobile communication terminal is determined in the mobile communication terminal by using detailed information of base stations existing in a predetermined area, received from a reference base station and peripheral base stations and stored before determining the position, and not receiving the detailed base station information from a server whenever determining the position in the mobile communication terminal, thereby reducing network loads and a required time.

An aspect of the present invention also provides a mobile communication terminal capable of position determination and a method of determining a position in the mobile communication terminal, in which the position of the mobile communication terminal is more precisely determined in the mobile communication terminal by using a software module instead of adding an additional hardware module, thereby using a position determination service at a lower manufacturing cost.

An aspect of the present invention also provides a mobile communication terminal capable of position determination and a method of determining a position in the mobile communication terminal, in which the position of the mobile communication terminal is determined in the mobile communication terminal by using base station signal information with respect to a reference base station and peripheral base stations, received in real time, thereby more precisely determining the position of the mobile communication terminal.

An aspect of the present invention also provides a mobile communication terminal capable of position determination and a method of determining a position in the mobile communication terminal, in which at least one of a position determination result and more than a predetermined number of GPS results are stored and a calculated position is corrected by referring to the stored information when determining the position for a subsequent instance, thereby greatly improving precision of determining the position.

According to an aspect of the present invention, there is provided a mobile communication terminal capable of position determination, including: a base station information recorder recording detailed base station information corresponding to at least one base station; a base station signal receiver receiving base station signal information from a reference base station at a predetermined interval; a base station information reader reading the detailed base station information with respect to a base station corresponding to the received base station signal information, from the base station information recorder; and a position determiner determining a position of the mobile communication terminal by using the received base station signal information and the read detailed base station information.

According to another aspect of the present invention, there is provided a mobile communication terminal capable of position determination, including: a base station signal receiver receiving base station signal information corresponding to a reference base station at a predetermined interval from the reference base station; and a position determiner determining a position of the mobile communication terminal by a network-based position determination method by using the received base station signal information.

According to still another aspect of the present invention, there is provided a method of determining a position in a mobile communication terminal, including: collecting base station signal information received from a reference base station at a predetermined interval; reading detailed base station information with respect to a base station corresponding to the collected base station signal information from a base station information recorder in which detailed base station information corresponds to at least one base station; and determining the position of the mobile communication terminal by using the collected base station signal information and the read detailed base station information.

According to yet another aspect of the present invention, there is provided a method of determining a position in a mobile communication terminal, including: collecting base station signal information received from a reference base station at a predetermined interval; and determining the position of the mobile communication terminal by a network-based position determination method by using the collected base station signal information.

For example, a mobile communication terminal mentioned in the present specification may be any one of a computer terminal, a public switched telephone network (PSTN) terminal, a Voice over Internet Protocol (VoIP) device, a Session Initiation Protocol device, a media gateway controller (Megaco), a personal digital assistant (PDA), a cellular phone, a personal communication service (PCS) phone, a hand-held PC, a CDMA-2000 (1X, 3X) phone, a WCDMA phone, a dual band/dual mode phone, a global system for mobile communication (GSM) phone, a mobile broadband system (MBS) phone, a satellite/digital multimedia broadcasting phone, a Wibro terminal, and a WIMAX terminal.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF THE INVENTION

Figure 1:
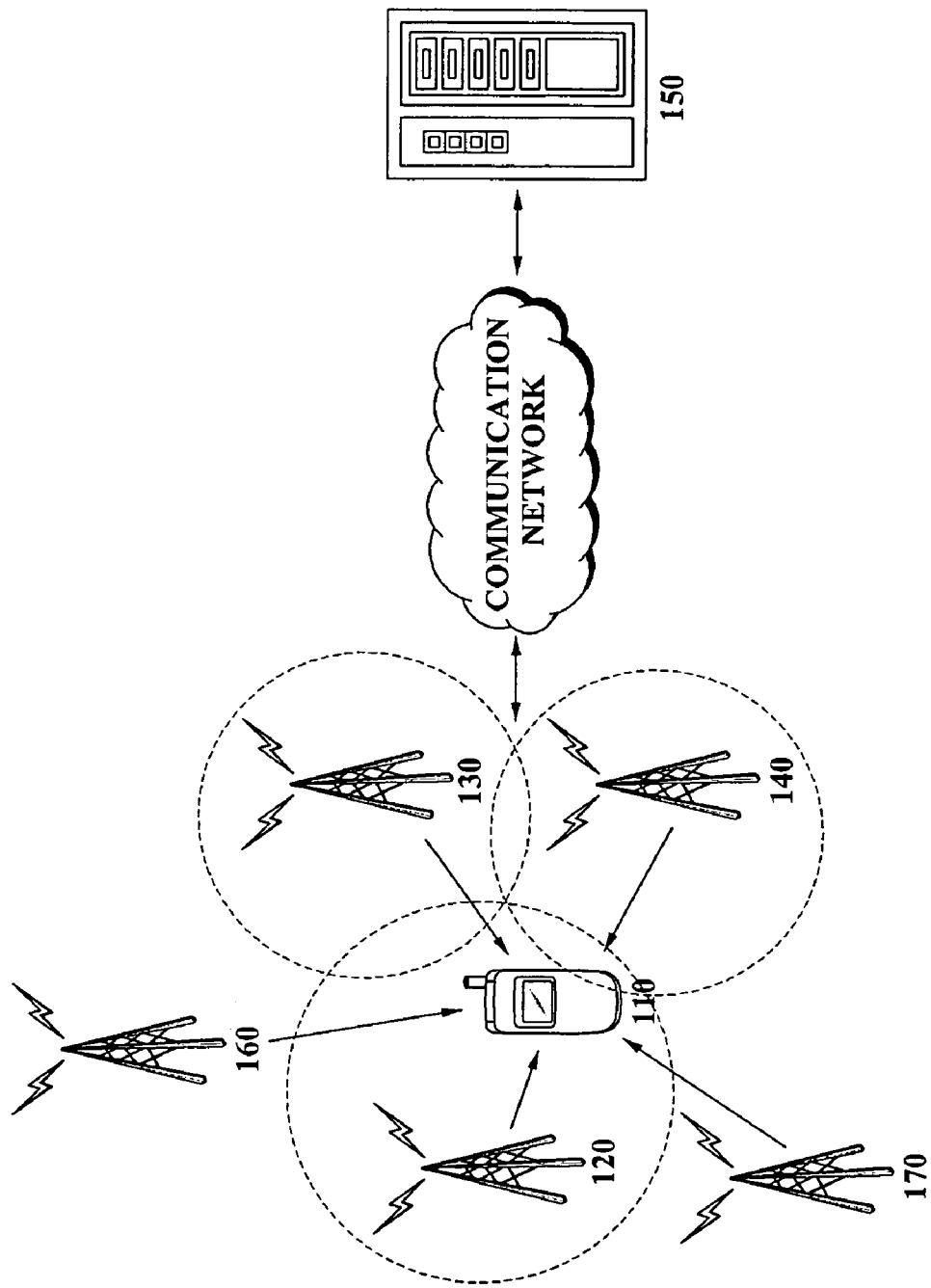
FIGS. 1 and 2 are diagrams illustrating network connection of a mobile communication terminal, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
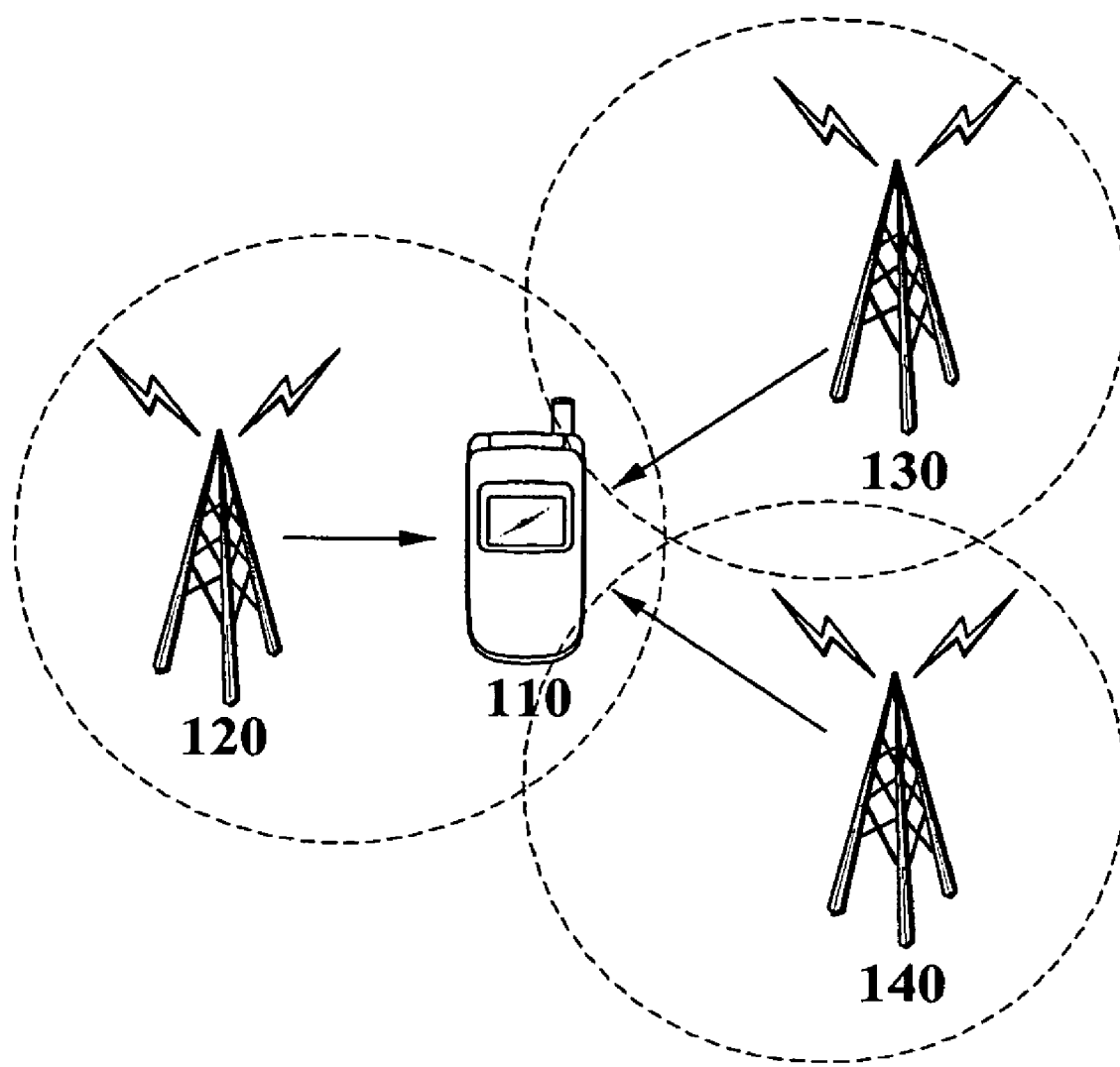

FIGS. 1 and 2 are diagrams illustrating network connection of a mobile communication terminal according to an embodiment of the present invention.

Referring to FIG. 1, the mobile communication terminal 110 receives base station signal information from a reference base station 120 at a predetermined interval, reads detailed base station information corresponding to the reference base station 120, and determines a position of the mobile communication terminal 110 by using the received base station signal information and the read detailed base station information. In this case, the mobile communication terminal 110 may further receive base station signal information from peripheral base stations 130 and 140.

Also, since the detailed base station information corresponding to the reference base station 120 and the peripheral base stations 130 and 140 does not exist in the base station information recorder, the mobile communication terminal 110 may request a predetermined server 150 to send the detailed base station information corresponding to the reference base station 120 and the peripheral base stations 130 and 140, and may receive the detailed base station information from the server 150. Also, the mobile communication terminal 110 may further request the server 150 to send detailed base station information corresponding to at least one base station 160 and 170 existing in a predetermined area including the reference base station 120 and the peripheral base stations 130 and 140 and may receive the detailed base station information corresponding to the at least one base station 160 and 170 existing in the predetermined area.

Referring to FIG. 2, the mobile communication terminal 110 receives base station signal information corresponding to the reference base station 120 at a predetermined interval and may determine a position of the mobile communication terminal by using the received base station signal information.

In this case, the mobile communication terminal 110 may further receive base station signal information corresponding to the peripheral base stations 130 and 140 from at least one of the base stations 130 and 140, and may determine the position of the mobile communication terminal 110 by using the base station signal information corresponding to the reference base station 120 and the peripheral base stations 130 and 140.

Figure 3:
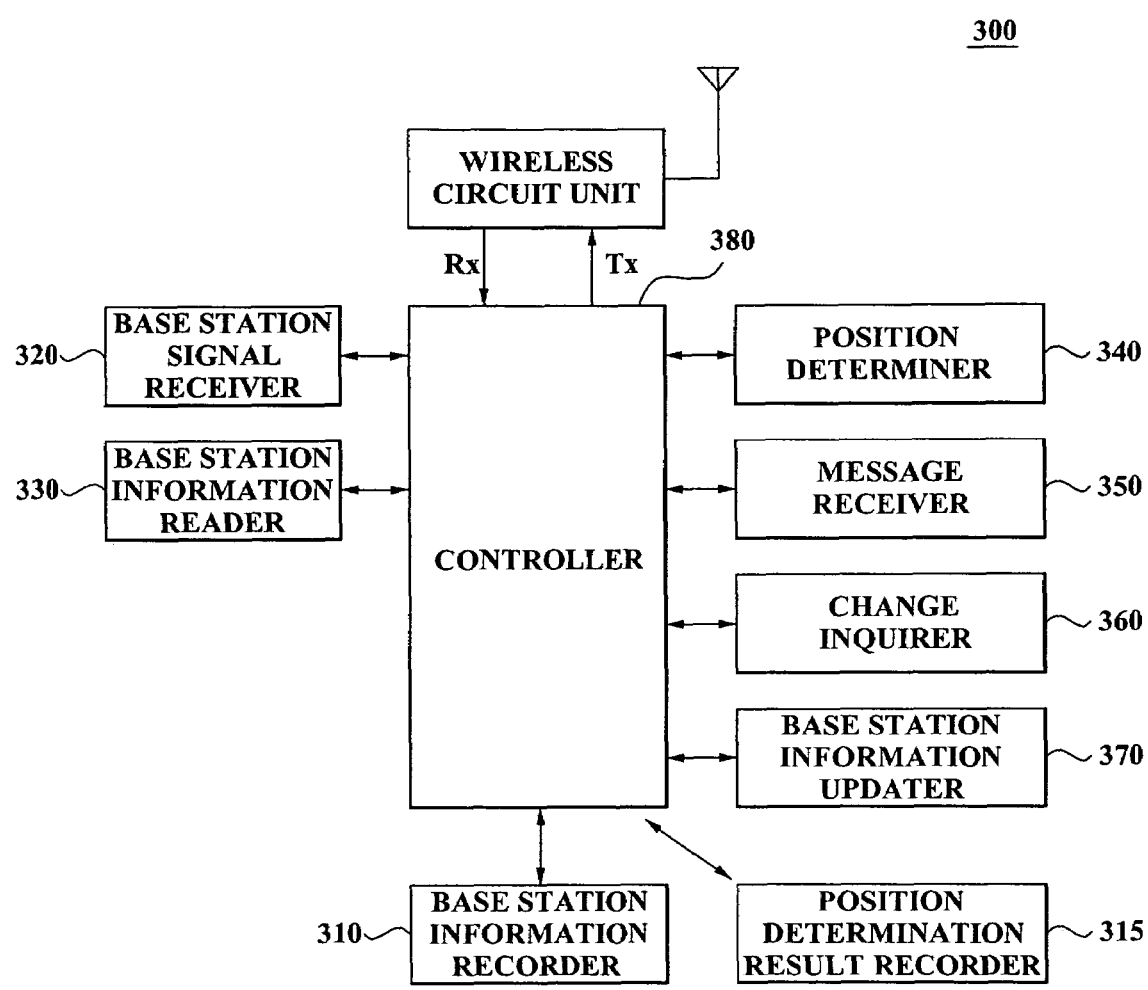
FIG. 3 is a block diagram illustrating an internal configuration of a mobile communication terminal according to an embodiment of the present invention.

FIG. 3 is a block diagram illustrating an internal configuration of a mobile communication terminal 300 according to an embodiment of the present invention.

Referring to FIG. 3, the mobile communication terminal 300 includes a base station information recorder 310, a position determination result recorder 315, a base station signal receiver 320, a base station information reader 330, a position determiner 340, a message receiver 350, a change inquirer 360, a base station information updater 370, and a controller 380.

The base station information recorder 310 records detailed base station information corresponding to at least one base station, received from a predetermined server. According to an embodiment, the detailed base station information may include base station identification information, coordinates of latitude and longitude of a base station antenna, base station antenna height information, antenna direction information, and angle range of sending and receiving signals information, related to determining a position of the mobile communication terminal 300.

The base station signal receiver 320 receives base station signal information from a reference base station at a predetermined interval. According to an embodiment, the base station signal receiver 320 may further receive base station signal information with respect to at least one peripheral base station, from the peripheral base station. The base station signal receiver 320 may more precisely receive base station signal information corresponding to a base station by receiving the base station signal information from the reference base station and the at least one peripheral base station.

According to an embodiment, the base station signal information received from the reference base station or the peripheral base station may include latitude and longitude information of the base station and may include information associated with hand-off, such as a PN code of the peripheral base station.

The base station information reader 330 reads the detailed base station corresponding to the reference base station and the peripheral base station from the base station information recorder 310.

Depending upon embodiments, the base station information reader 330 may include a base station information search unit, a base station information receiving unit, and a base station information recording unit. A configuration for reading the detailed base station information corresponding to the reference base station and the peripheral base station by the base station information reader 330 will be described in detail as follows.

The base station information search unit searches for the detailed base station information corresponding to the reference base station and the peripheral base station from the base station information recorder 310. For example, the base station information search unit may search for detailed information A corresponding to a base station A, the reference base station; and detailed information B and detailed information C corresponding to base station B and base station C, the peripheral base stations.

When the detailed base station information is not located, the base station information receiving unit requests the server to send the detailed base station information corresponding to the reference base station and the peripheral base station, and receives the detailed base station information sent from the server in response to the request. For example, when the detailed information B corresponding to the base station B is not located, the base station information receiving unit may request the server to send the detailed information B corresponding to the base station B and may receive the detailed information B sent from the server in response to the request.

According to an embodiment, the base station information receiving unit may further request the server to send detailed base station information with respect to at least one base station existing in an extended area including the reference base station and the peripheral base station and may receive the detailed base station information from the server. The extended area is an area including the reference base station information and the peripheral base station and may be one of an area in a predetermined range from positions of the reference base station and the peripheral base station, an area where the mobile communication terminal is expected to move to in a predetermined amount of time, and an area of a range previously established according to a service scenario. According to the present invention, the detailed base station information with respect to the at least one base station existing in the extended area is received and recorded in addition to the detailed base station information with respect to the reference base station and the peripheral base station required in determining a present position of the mobile communication terminal 300, thereby reducing network loads and a required time by determining the position of the mobile communication terminal 300 from the recorded detailed base station information instead of receiving the detailed base station information from the server when subsequently determining the position of the mobile communication terminal 300.

Also, according to the present embodiment, the base station information receiving unit may request detailed base station information excluding the detailed base station information recorded in the base station information recorder 310 when requesting the server to send the detailed base station information. For example, the base station information receiving unit may request detailed base station information excluding the detailed information A, the detailed information B, and the detailed information C recorded in the base station information recorder 310 when requesting the server to send detailed base station information. Specifically, the base station information receiving unit requests the server to send the detailed base station information excluding the detailed base station information recorded in the base station information recorder 310, thereby preventing duplication of the detailed base station information recorded in the base station information recorder 310.

The base station information recorder records the received detailed base station information in the base station information recorder 310.

According to an embodiment, the base station information recording unit may record the detailed base station information by comparing the received detailed base station information with the detailed base station information recorded in the base station information recorder 310, and deleting duplicated detailed base station information from the detailed base station information according to a predetermined reference.

Also, according to the present embodiment, the base station information recording unit may record the detailed base station information in the base station information recorder 310 by requesting the detailed base station information excluding the detailed base station information recorded in the base station information recorder 310 when requesting the server to send the detailed base station information or deleting duplicated detailed base station information according to a predetermined reference by comparing the received detailed base station information with the detailed base station information recorded in the base station information recorder 310.

Also, according to another embodiment of the present invention, the base station information recorder 310 may determine an area where a user of the mobile communication terminal 300 is expected to be when the user moves toward the determined area for a predetermined amount of time, according to a predetermined reference, may request the server to send the detailed base station information signal of at least one base station existing in the determined area, may receive the detailed base station information from the server, and may record the received detailed base station information in the base station information recorder 310.

The position determiner 340 determines the position of the mobile communication terminal 300 by using the received base station signal information and the read detailed base station information. According to the present invention, since the position of the mobile communication terminal 300 is determined by using the received base station signal information corresponding to the reference base station, the peripheral base station, and the read detailed base station information, the position of the mobile communication terminal 300 may be more precisely determined than when determining the position of the mobile communication terminal 300 by using only the base station signal information.

According to embodiments, the position determiner 340 may refer to more than a predetermined number of position determination results recorded in the position determination result recorder 315 when determining a next position. As described above, the position is determined by referring to more than the predetermined number of previous position determination results, thereby greatly improving precision of position.

The position determination recorder 315 may store predetermined number or more position determination results previously calculated by the position determiner 340. When a mobile communication terminal includes a GPS module, more than a predetermined number of GPS position determination results may be stored in the position determination result recorder 315. When more than the predetermined number of GPS position determination results is stored in the position determination result recorder 315, the position determiner 340 may determine the position of the mobile communication terminal by using the predetermined number of position determination results and the GPS position determination results when performing subsequent position determination.

In this case, the position determiner 340 may estimate a subsequent position determination result by analyzing existing position determination results and may correct the position determination result by removing, through filtering, a signal greatly diverging from an estimated range from base station signals received by the mobile communication terminal when performing the subsequent position determination or comparing a final position determination result with the estimated result.

According to embodiments, the position determiner 340 may include a position determination result management unit, a position determination result analysis unit, and a position determination result correction unit.

The position determination result management unit may manage position determination result information with respect to the mobile communication terminal 300. Specifically, the position determination result management unit performs operations of storing/deleting/searching previous position determination result information. When the mobile communication terminal 300 includes a GPS module, the position determination result management unit may also manage GPS position determination result information.

The position determination result analysis unit may calculate any one of an estimated position with respect to the position of the mobile communication terminal 300, an estimated position range, and a coefficient used in an algorithm for correction, by analyzing the recorded position determination result information with reference to the position determination result recorder 315.

The position determination result correction unit may correct the determined position of the mobile communication terminal 300 by using the estimated position.

Making the detailed base station information recorded in the server coincide with the detailed base station information recorded in the base station information recorder 310 in the mobile communication terminal 300 will be described as follows.

According to a first embodiment, when the detailed base station information stored in the server is changed, the message receiver 350 may receive a message indicating a change from the server. In this case, the message may be an SMS message.

Also, according to the present embodiment, the base station information updater 370 may delete all the detailed base station information recorded in the base station information recorder 310, may receive detailed base station information corresponding to the base station from the server, and may record the received detailed base station information. Also, the base station information updater 370 may search for changed detailed base station information from the detailed base station information recorded in the base station information recorder 310, may receive the changed base station information from the server, and may update the detailed base station information.

According to a second embodiment, the change inquirer 360 may send a query inquiring whether the detailed base station information stored in the base station information recorder 310 is changed, to the server at a predetermined interval and may receive a response corresponding to the query from the server.

According to the present embodiment, when the response corresponding to the query indicates that the detailed base station information is changed, the base station information updater 370 may delete all the detailed base station information recorded in the base station information recorder 310, may receive detailed base station information corresponding to the base station from the server, and may record the received detailed base station information. Also, the base station information updater 370 may search for changed detailed base station information from the detailed base station information recorded in the base station information recorder 310, may receive the changed base station information from the server, and may update the detailed base station information.

According to a third embodiment, the detailed base station information recorded in the base station information recorder 310 may include valid information and the base station information updater 370 may update the detailed base station information by receiving the detailed base station information from the server, when the valid information is expired.

The controller 380 may a function of a processor processing all data on a mobile communication unit associated with a modem DSP. Since processing speed increases in proportion to a number of digital signal processors (DSPs) for processing an internal signal such as a base band signal, an operation according to each mode may be quickly processed. The controller 380 may include a Mobile Station Modem (MSM), a DSP, and an Open Multimedia Application Platform (OMAP).

However, a method of embodying the controller 380 is irrelevant to the technical scope of the present invention. Though there is a different platform or different software between the elements shown in FIG. 3, it is not considered as departing from the scope of the present invention.

Figure 4:
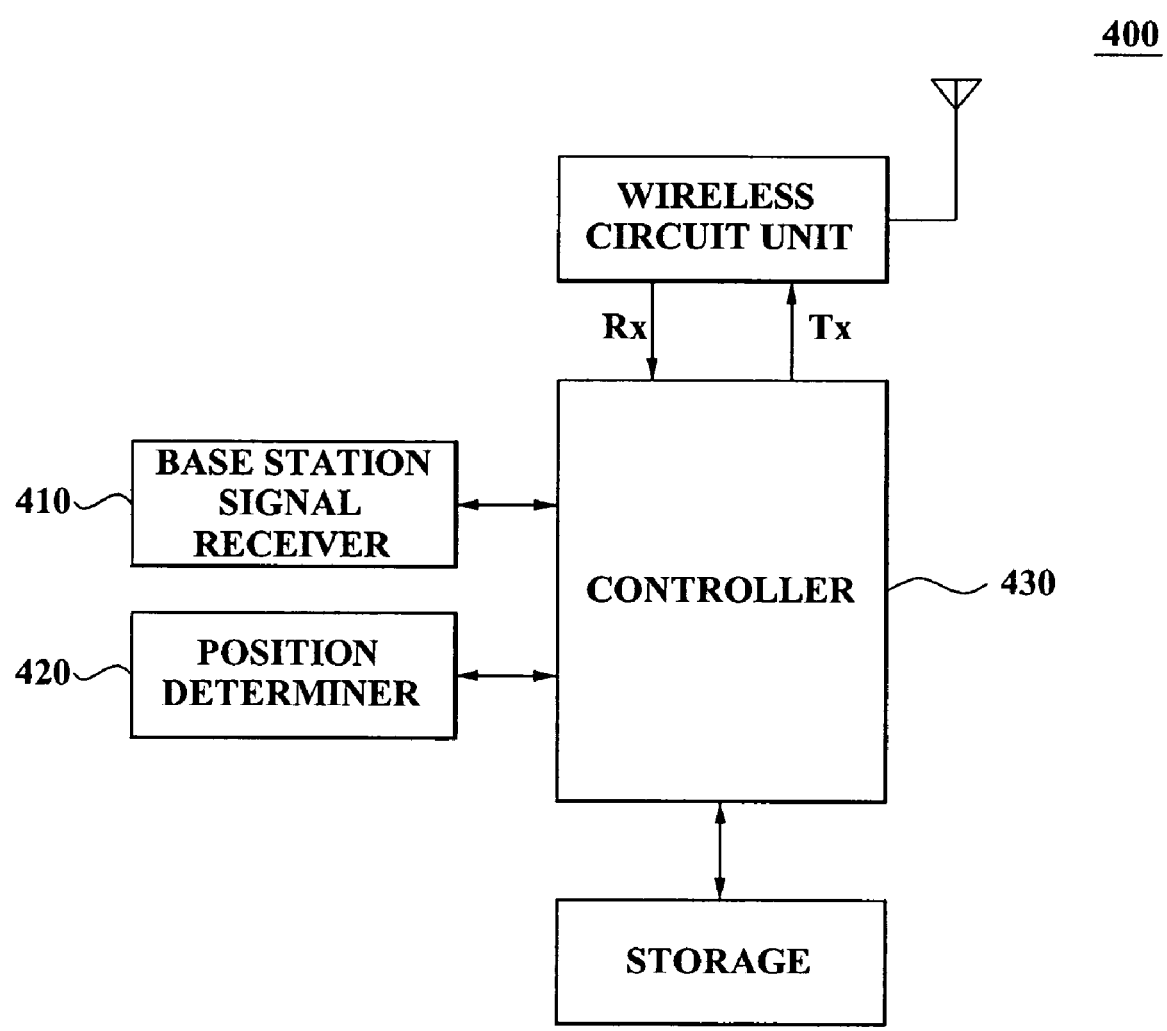
FIG. 4 is a block diagram illustrating an internal configuration of a mobile communication terminal according to another embodiment of the present invention.

FIG. 4 is a block diagram illustrating an internal configuration of a mobile communication terminal 400 according to another embodiment of the present invention.

As shown in FIG. 4, the mobile communication terminal 400 includes a base station signal receiver 410, a position determiner 420, and a controller 430.

The base station signal receiver 410 receives base station signal information corresponding to a reference base station from the reference base station at a predetermined interval.

According to an embodiment of the present invention, the base station signal receiver 410 may further receive base station signal information corresponding to at least one peripheral base station from the peripheral base station.

Also, according to another embodiment of the present invention, the base station signal information received from the base station or the peripheral base station may include latitude and longitude information of a base station, and may include information associated with hand-off, such as a PN code of the peripheral base station.

The position determiner 420 determines a position of the mobile communication terminal 400 by using the received base station signal information.

According to an embodiment of the present invention, the position determiner 420 may determine the position of the mobile communication terminal 400 by a network-based position determination method by using latitude and longitude information of base stations included in the base station signal information corresponding to the reference base station and the peripheral base station and information associated with hand-off of the peripheral base station.

The controller 430 may generally include a function of processing all data on a terminal device associated with a modem DSP. Since processing speed increases in proportion to a number of DSPs for processing an internal signal such as a base band signal, an operation according to each mode may be quickly processed. The controller 430 may include an MSM, a DSP, and an OMAP.

As described with reference to FIG. 3, the mobile communication terminal 400 shown in FIG. 4 may also record position determination result information and may correct the position determination result by using position determination result information.

As described with reference to FIGS. 3 and 4, the mobile communication terminal of the present invention may determine a position of the mobile communication terminal in an idle state by determining the position in the mobile communication terminal instead of transmitting base station signal information to a server and determining the position by using the base station signal information sent from the server. Specifically, in the present invention, since there is no need to send base station information received by the mobile communication terminal to the server, position determination can be performed in an idle state instead of an active state or connected mode.

Figure 5:
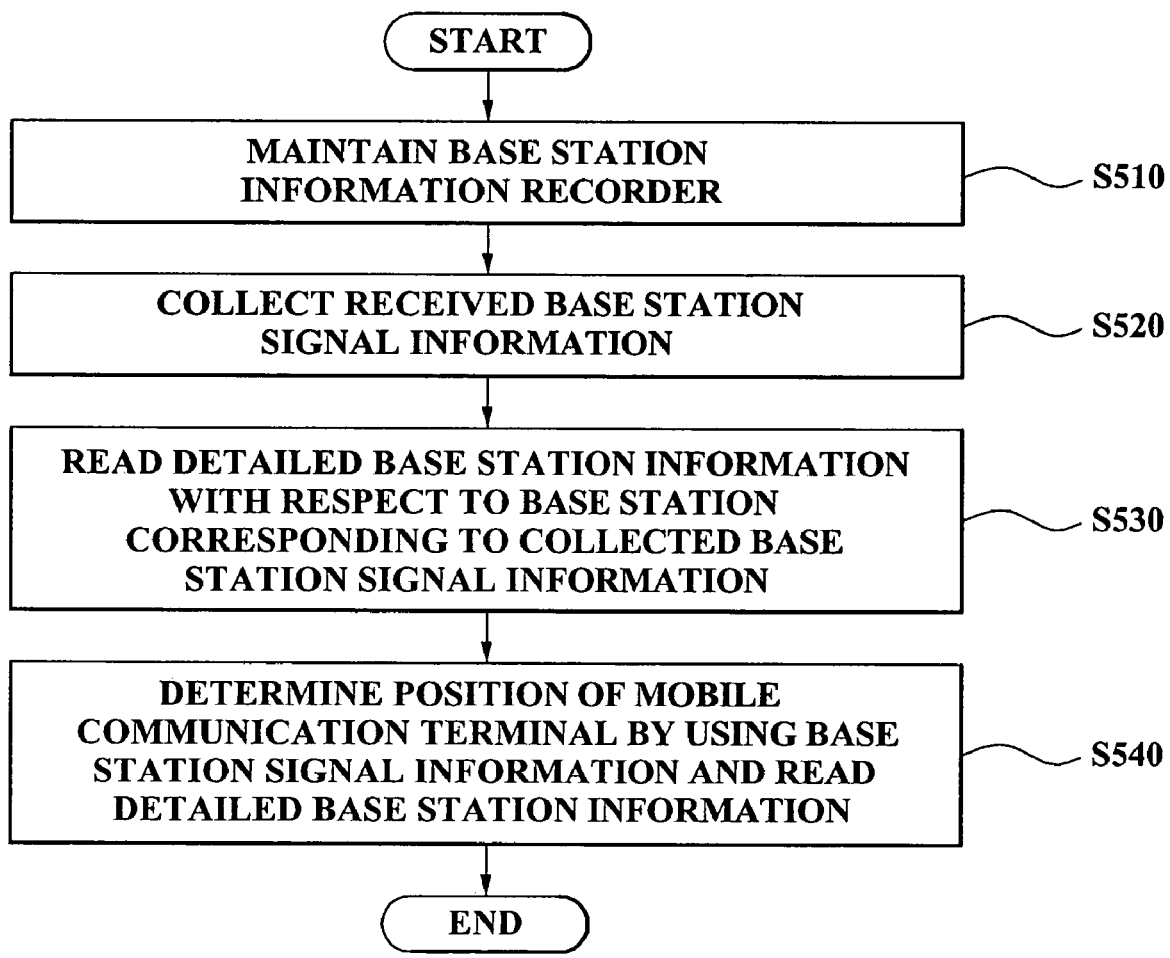
FIG. 5 is a flowchart illustrating a method of determining a position of a mobile communication terminal, according to an embodiment of the present invention.

FIG. 5 is a flowchart illustrating a method of determining a position of a mobile communication terminal, according to an embodiment of the present invention.

In operation S510, a base station information recorder recording detailed base station information corresponding to at least one base station, received from a predetermined server, is maintained. According to an embodiment of the present invention, the detailed base station information may include at least one of base station identification information, coordinates of latitude and longitude of a base station antenna, base station antenna height information, antenna direction information, and angle range information of sending and receiving a signal.

In operation S520, base station signal information received from a reference base station at a predetermined interval is collected. According to embodiments, base station signal information received from at least one peripheral base station in addition to the reference base station may be further collected.

Also, according to an embodiment of the present invention, the base station signal information received from the reference base station or the peripheral base station may include latitude and longitude information of a base station and may include information for hand-off, such as a PN code of the peripheral base station.

In operation S530, with reference to the base station information recorder in which the detailed base station information corresponding to the at least one base station is recorded, detailed base station information with respect to the collected base station signal information is read.

Figure 6:
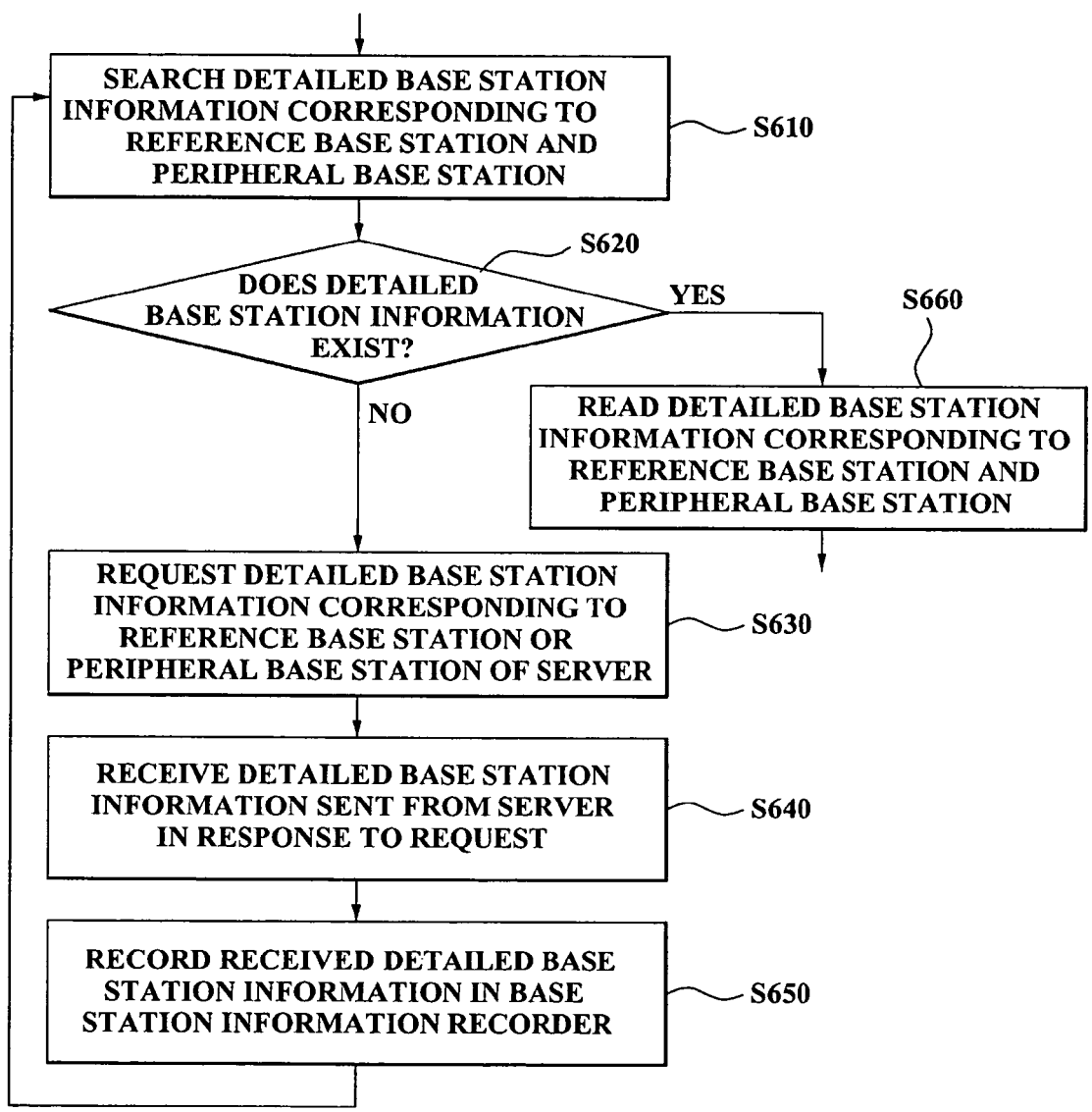
FIG. 6 is a flowchart illustrating a method of reading detailed base station information, according to an embodiment of the present invention.

FIG. 6 is a flowchart illustrating a method of reading detailed base station information, according to an embodiment of the present invention.

In operation S610, detailed base station information corresponding to the reference base station and the peripheral base station is searched for from the base station information recorder.

When the detailed base station information is not located in operation S620, the server is requested to send the detailed base station information corresponding to the base station or the peripheral base station in operation S630.

In operation S640, the mobile communication terminal receives the detailed base station information sent from the server in response to the request.

According to an embodiment of the present invention, the mobile communication terminal may request detailed base station information excluding the detailed base station information recorded in the base station information recorder when requesting the server to send the detailed base station information.

In operation S650, the mobile communication terminal records the received base station information in the base station information recorder.

According to an embodiment of the present invention, the detailed base station information may be recorded in the base station information recorder by comparing the received detailed base station information with the detailed base station information recorded in the base station information recorder and deleting duplicated detailed base station information according to a predetermined reference.

When the detailed base station information is located in operation S620, the detailed base station information corresponding to the reference base station and the peripheral base station is read from the base station information recorder in operation S660.

Referring to FIG. 5, in operation S540, the position of the mobile communication terminal is determined by using the received base station signal information and the read detailed base station information.

Since the contents described with reference to FIG. 3 may be applied as is to the position determination method in the mobile communication terminal according to the present invention, a detailed description thereof will be omitted.

Figure 7:
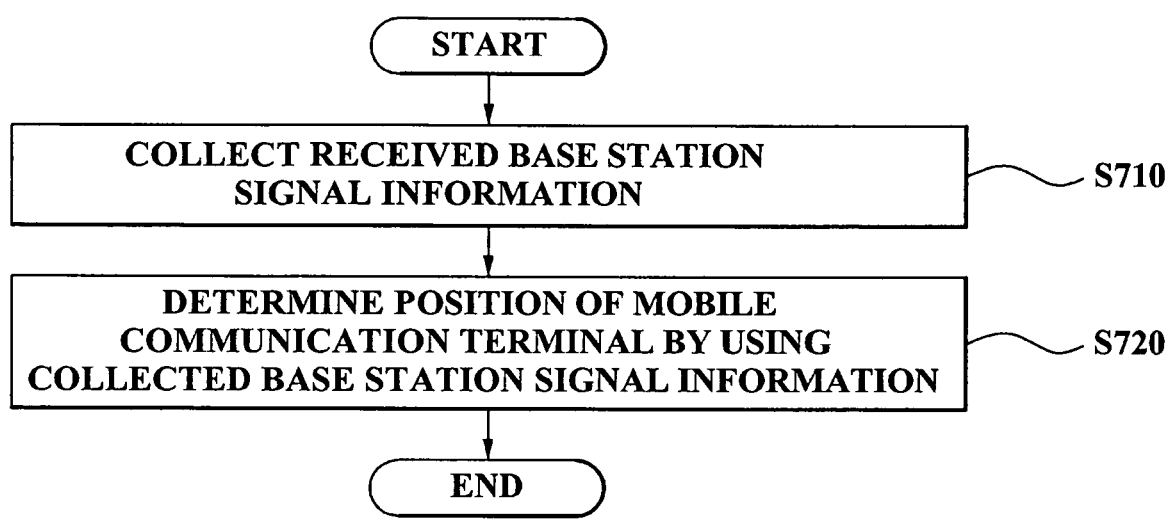
FIG. 7 is a flowchart illustrating a method of determining a position of a mobile communication terminal, according to another embodiment of the present invention.

FIG. 7 is a flowchart illustrating a method of determining a position of a mobile communication terminal, according to another embodiment of the present invention.

In operation S710, base station signal information received from a reference base station at a predetermined interval is collected.

According to an embodiment of the present invention, base station signal information received from at least one peripheral base station in addition to the reference base station may be further collected.

In operation S720, a position of the mobile communication terminal is determined by a network-based position determination method by using the collected base station signal information.

In this case, the network-based position determination method may be one of time difference of arrival (TDOA), Advanced Forward Link Triangulation (AFLT), enhanced observed time difference (EOTD), observed time difference of arrival (OTDOA), and cell ID.

According to an embodiment of the present invention, the position determination method may determine the position of the mobile communication terminal by the network-based position determination method by using latitude and longitude information of base stations included in the base station signal information corresponding to the reference base station and the peripheral base station and information associated with hand-off of the peripheral base station.

Figure 8:
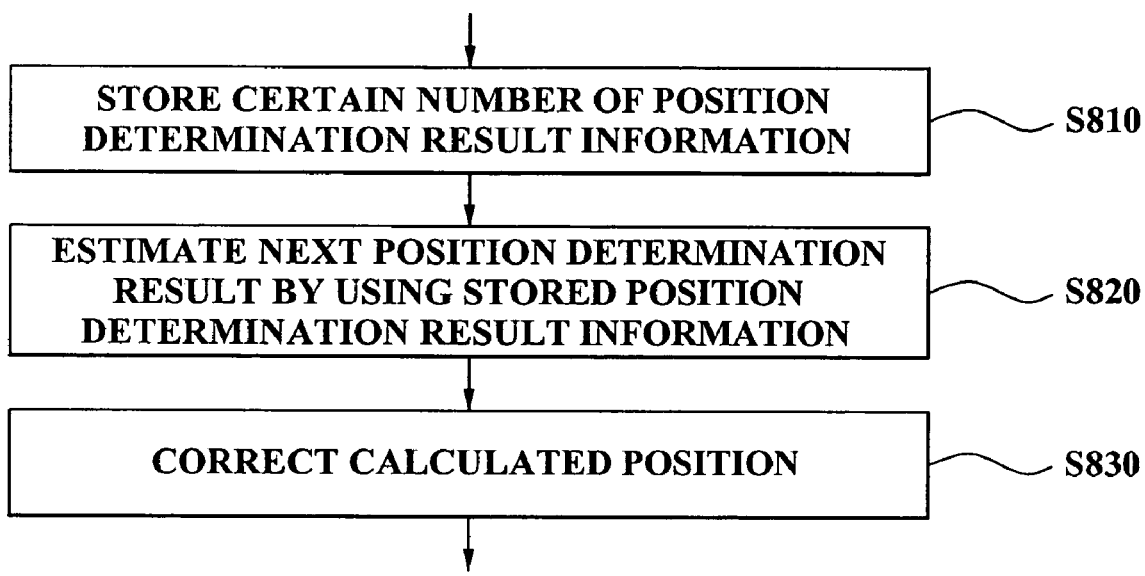
FIG. 8 is a flowchart illustrating an example of the operation of determining a position shown in FIGS. 5 and 7.

FIG. 8 is a flowchart illustrating an example of the operation of determining a position shown in FIG. 5 or 7.

A predetermined number of position determination result information is stored in a position determination result recorder (S810). In this case, the position determination result information may include GPS position determination result information.

Also, any one of an estimated position with respect to the position of the mobile communication terminal, an estimated position range, and a coefficient used in an algorithm for correction is calculated (S820).

Also, the determined position of the mobile communication terminal is corrected by using a result of the calculation (S830).

According to embodiments, in operation S820, signals greatly diverging from an estimated range from the base station signals received by the mobile communication terminal when performing position determination are selected, and the position of the mobile communication terminal may be determined by using signals excluding the selected base station signal, in operation S830.

The method of determining a position in a mobile communication terminal according to the present invention may be embodied as a program instruction capable of being executed via various computer units and may be recorded in a computer-readable recording medium. The computer-readable medium may include a program instruction, a data file, and a data structure, separately or cooperatively. The program instructions and the media may be those specially designed and constructed for the purposes of the present invention, or they may be of the kind well-known and available to those skilled in the art of computer software arts. Examples of the computer-readable media include magnetic media (e.g., hard disks, floppy disks, and magnetic tapes), optical media (e.g., CD-ROMs or DVD), magneto-optical media (e.g., optical disks), and hardware devices (e.g., ROMs, RAMs, or flash memories, etc.) that are specially configured to store and perform program instructions. Examples of the program instructions include both machine code, such as produced by a compiler, and files containing high-level language codes that may be executed by the computer using an interpreter. The hardware elements above may be configured to act as one or more software modules for implementing the operations of this invention.

An aspect of the present invention provides a mobile communication terminal capable of position determination and a method of determining a position in the mobile communication terminal, in which the position of the mobile communication terminal is determined in the mobile communication terminal by using base station signal information with respect to a reference base station and peripheral base stations and detailed base station information with respect to the reference base station and the peripheral base stations, sent from a server, thereby more precisely determining the position of the mobile communication terminal.

An aspect of the present invention also provides a mobile communication terminal capable of position determination and a method of determining a position in the mobile communication terminal, in which the position of the mobile communication terminal is determined in the mobile communication terminal by using detailed information of base stations existing in a predetermined area, received from a reference base station and peripheral base stations and stored before determining the position, and not receiving the detailed base station information from a server whenever determining the position in the mobile communication terminal, thereby reducing network loads and a required time.

An aspect of the present invention also provides a mobile communication terminal capable of position determination and a method of determining a position in the mobile communication terminal, in which the position of the mobile communication terminal is more precisely determined in the mobile communication terminal by using a software module instead of adding an additional hardware module, thereby using a position determination service at a lower manufacturing cost to expand a market of location-based service (LBS).

An aspect of the present invention also provides a mobile communication terminal capable of position determination and a method of determining a position in the mobile communication terminal, in which the position of the mobile communication terminal is determined in the mobile communication terminal by using base station signal information with respect to a reference base station and peripheral base stations, received in real time, specifically, several times for each determination, thereby more precisely determining the position of the mobile communication terminal when compared to a conventional position determination method of determining a position of a mobile communication terminal by collecting base station signal information limited to once for each determination.

An aspect of the present invention also provides a mobile communication terminal capable of position determination and a method of determining a position in the mobile communication terminal, in which at least one of a position determination result and more than a predetermined number of GPS results are stored and a calculated position is corrected by referring to the stored information when determining the position for a subsequent instance, thereby greatly improving precision of determining the position.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A mobile communication terminal capable of position determination by using base station signal information received from a base station, comprising:

a base station information recorder recording detailed base station information corresponding to at least one base station, wherein the detailed base station information comprises base station identification information, height information of the base station antenna and range information of an angle for transmitting and receiving a signal;

a base station information receiving unit receiving the detailed base station information with respect to at least one base station existing in an extended area including the reference base station and the peripheral base station, from a predetermined server;

a base station signal receiver receiving base station signal information from a reference base station at a predetermined interval;

a base station information reader reading the detailed base station information with respect to a base station corresponding to the received base station signal information, from the base station information recorder; and a position determiner determining a position of the mobile communication terminal by using the received base station signal information and the read detailed base station information, wherein the extended area is any one of an area in a predetermined range from the reference base station and the peripheral base station, an area in which the mobile communication terminal is expected to move to in a predetermined time, and an area in a previously established range according to a service scenario, and wherein, the position determiner determines the position of the mobile terminal when the mobile communication terminal is idle.

2. The mobile communication terminal of claim 1, wherein:

the base station signal receiver receives base station signal information from at least one peripheral base station in addition to the reference base station; and the base station information reader and the position determiner operate by using the base station information received from the peripheral base station.

3. The mobile communication terminal of claim 1, wherein the base station information recording unit deletes duplicated detailed base station information according to a predetermined reference by comparing the received detailed base station information with the detailed base station information recorded in the base station information recorder and records the received detailed base station information in the base station information recorder.

4. The mobile communication terminal of claim 1, wherein the base station information receiving unit requests the detailed base station information excluding the detailed base station information recorded in the base station information recorder when requesting the server to send the detailed base station information.

5. The mobile communication terminal of claim 1, further comprising a message receiver receiving a message from the server indicating a change when the detailed base station information stored in the server is changed.

6. The mobile communication terminal of claim 1, further comprising a change inquirer transmitting a query inquiring of the server whether the detailed base station information recorded in the base station information recorder is changed, at a predetermined interval, and receiving a response corresponding to the query from the server.

7. The mobile communication terminal of claim 1, further comprising a base station information updater searching for changed detailed base station information from the detailed base station information recorded in the base station information recorder, receiving the changed detailed base station information from the server, and updating the detailed base station information.

8. The mobile communication terminal of claim 1, wherein the detailed base station information recorded in the base station information recorder comprises valid information, and wherein the mobile communication terminal further comprises a base station information updater receiving the detailed base station information from the server when the valid information is expired and updating the detailed base station information.

9. The mobile communication terminal of claim 1, further comprising a position determination result recorder recording a predetermined amount of position determination result information, wherein the position determiner comprises:

a position determination result management unit managing position determination result information with respect to the determined position of the mobile communication terminal;

a position determination analysis unit calculating any one of an estimated position with respect to the position of the mobile communication terminal, a range of the estimated position, and a coefficient used in an algorithm for correction, by analyzing the recorded position determination result information with reference to the position determination recorder; and a position determination result corrector correcting the determined position of the mobile communication terminal by using a result of the calculation of the position determination result analysis unit.

10. The mobile communication terminal of claim 1, wherein the position determiner determines the position of the mobile communication terminal when the mobile communication terminal is idle.

11. A method of determining a position in a mobile communication terminal by using base station signal information received from a base station, comprising:

receiving a detailed base station information with respect to at least one base station existing in an extended area including the reference base station and the peripheral base station, from a predetermined server;

reading detailed base station information with respect to a base station corresponding to the collected base station signal information from a base station information recorder in which detailed base station information corresponds to at least one base station, wherein the detailed base station information comprises base station identification information, height information of the base station antenna and range information of an angle for transmitting and receiving a signal; and determining the position of the mobile communication terminal by using the collected base station signal information and the read detailed base station information, wherein the extended area is any one of an area in a predetermined range from the reference base station and the peripheral base station, an area in which the mobile communication terminal is expected to move to in a predetermined time, and an area in a previously established range according to a service scenario, and wherein, the determining the position of the mobile terminal when the mobile communication terminal is idle.

12. The method of claim 11, wherein, in the collecting base station signal information, the base station signal information received from at least one peripheral base station in addition to the reference base station is further collected.

13. The method of claim 11, wherein the recording the received detailed base station information in the base station information recorder comprises recording the detailed base station information in the base station information recorder by comparing the received detailed base station information with the detailed base station information recorded in the base station information recorder and deleting duplicated detailed base station information according to a predetermined reference.

14. The method of claim 11, wherein, the requesting the server to send the detailed base station information requests the detailed base station information that is not recorded in the base station information recorder.

15. The method of claim 11, further comprising receiving a message indicating a change from the server when the detailed base station information stored in the server is changed.

16. The method of claim 11, further comprising:
 transmitting a query inquiring whether the detailed base station information recorded in the base station information recorder is changed, to the server at a predetermined interval; and
 receiving a response corresponding to the query from the server.

17. The method of claim 11, wherein the detailed base station information recorded in the base station information recorder comprises valid information, and wherein the method further comprises receiving the detailed base station information from the server and updating the detailed base station information when the valid information is expired.

18. The method of claim 11, wherein, with reference to a position determination result recorder in which a predetermined number of position determination result information is recorded, any one of an estimated position with respect to the position of the mobile communication terminal, a range of the estimated position, a coefficient used in an algorithm for correction is calculated by analyzing the position determination result information, and the determined position of the mobile communication terminal is corrected by using a result of the calculation.

19. The method of claim 11, wherein, in the determining the position of the mobile communication terminal, the position of the mobile communication terminal is determined when the mobile communication terminal is idle.

20. A computer-readable recording medium encoded with processing instructions for causing a processor to execute a method of determining a position in a mobile communication terminal by using base station signal information received from a base station, the method comprising:
 receiving a detailed base station information with respect to at least one base station existing in an extended area including the reference base station and the peripheral base station, from a predetermined server;
 reading detailed base station information with respect to a base station corresponding to the collected base station signal information from a base station information recorder in which detailed base station information corresponds to at least one base station wherein the detailed base station information comprises base station identification information, height information of the base station antenna and range information of an angle for transmitting and receiving a signal; and
 determining the position of the mobile communication terminal by using the collected base station signal information and the read detailed base station information,
 wherein the extended area is any one of an area in a predetermined range from the reference base station and the peripheral base station, an area in which the mobile communication terminal is expected to move to in a predetermined time, and an area in a previously established range according to a service scenario,
 and wherein, the determining the position of the mobile terminal when the mobile communication terminal is idle.

\* \* \* \* \*